United States Patent [19]

Joschko et al.

[11] 4,085,939
[45] Apr. 25, 1978

[54] REWORKING OF A PLAYBACK OR RECORDING MEMBER GUIDE BODY

[75] Inventors: Günter Joschko; Karl-Ekkehard Schriefl, both of Berlin, Germany

[73] Assignee: TED Bildplatten Aktiengesellschaft AEG-Telefunken-Teldec, Zug, Switzerland

[21] Appl. No.: 678,764

[22] Filed: Apr. 21, 1976

[30] Foreign Application Priority Data

Apr. 30, 1975 Germany .............................. 2519172

[51] Int. Cl.² .......................... G11B 3/56; G11B 3/58
[52] U.S. Cl. ................................................ 274/1 R
[58] Field of Search ............................... 274/1 R, 47

[56] References Cited

U.S. PATENT DOCUMENTS

| 1,569,403 | 1/1926 | Slye | 274/38 |
| 3,873,098 | 3/1975 | Leedom | 274/1 R |

FOREIGN PATENT DOCUMENTS

| 2,344,105 | 3/1975 | Germany | 274/1 R |
| 2,344,103 | 3/1975 | Germany | 274/1 R |

*Primary Examiner*—Harry N. Haroian
*Attorney, Agent, or Firm*—Spencer & Kaye

[57] ABSTRACT

In order to effect repeated reworking of a body, whose tip, during use, engages a record carrier track to guide a playback or recording member along the track, the reworking involving subjecting the body to successive reworking operations after successive periods of use, the tip of the body being worn down to a certain extent during each period of use and material being removed from the tip to restore its original shape during each reworking operation, the useful life of the body is effectively increased by adjusting the maximum removal depth occurring during each successive reworking operation as a function of the depth to which the tip is worn during the corresponding preceding period of use.

12 Claims, 10 Drawing Figures

REWORKING OF A PLAYBACK OR RECORDING MEMBER GUIDE BODY

BACKGROUND OF THE INVENTION

The present invention relates to a method and control apparatus for the repeated reworking of a body which is provided to guide a playback or recording member along a track on a record carrier, and particularly for a reworking operation in which part of the body is removed after a period of wear.

Such a track may, for example, be a groove in a rotating disc or foil, preferably in a video record. The body to be reworked may be a diamond, in particular, which slides along such groove in order to guide a playback scanning or recording member. The scanning member preferably is a pressure transducer of a playback system operating according to the pressure scanning technique, the transducer being rigidly connected with the diamond body.

The record carrier for such a system has a narrow groove width of the order of only a few microns and rotates at a high playback speed of, for example, 1500 rpm while having a diameter of 21 cm, resulting in relatively rapid wear of the guid body due to the high relative speed developed during operation between the body and the record carrier and despite the low contact pressure of the body against the groove walls. It has therefore become necessary to include in video record players designed to operate according to the pressure scanning technique a reworking or regrinding device which takes care that the diamond body is resurfaced in a profiled grinding groove after a certain period of use, for example after playing a video record, whereby part of the diamond body is removed to such an extent that the profile of the body again coincides with that of the grinding groove.

In a known device of this type, after the playing of a video record for a maximum of 10 minutes, with a certain amount of resulting wear, reworking by way of repolishing or grinding takes place for a period of 6 seconds. This causes removal of such a large amount of material that the repolishing period is sufficient even if the contact surface of the body, which may have a skid shape for example, has, as an incident of previous repolishing operations, been enlarged to a great extent.

With this type of reworking by repolishing, the usefulness of the body is maintained for a longer period than without repolishing because the desired profile of the body is reestablished by repolishing after each period of wear. Otherwise, the profile of the body would become more and more like the profile of the groove in the record carrier and would thus lose its suitability for scanning signals or for guiding a pickup member. This would particularly be the case if, for a conical or pyramid-shaped body, the period of wear would have continued to such an extent that the surface of the body resting on the record carrier becomes wider than the groove, when seen from the top, producing so-called straddling by the body on the groove edges.

Repeated reworking of the body also has a drawback, however, because repolishing produces loss of material in addition to the loss of material occurring during use, which shortens the useful life of the body.

SUMMARY OF THE INVENTION

It is an object of the present invention to extend the lifetime of the body as much as possible while simultaneously causing the profile of the body to continue to approximate the ideal shape for as long a period as possible.

These and other objects are accomplished according to the present invention by performing the successive reworking operations which are carried out during the lifetime of the body in such a manner that the maximum removal depth occurring during a given reworking operation is a function of the depth to which the tip of the body has been worn during the corresponding preceding period of use.

The invention is based on the realization that in the prior art repolishing procedures in which a reworking process of constant duration is provided after each period of wear, for example after the playing of one video record, much more material is removed, particularly when the body is still new, than is necessary to keep the body in working order. It therefore results that the body prematurely reaches a state in which removal during the fixed polishing period will no longer be sufficient. This state is reached at the latest when the body has been ground down to its point of fastening or, in the case of a conical or pyramid-shaped body, when the body has been ground down to a point at which its contact surface to be reworked is broader, when seen from the top, than the polishing or grinding groove so that the body is seated on that surface of the polishing disc in which the polishing grooves are stamped, without the body being able to still touch the bottom of the polishing groove, this corresponding to straddling by the body on the edges of the polishing groove.

A body which has been polished until it straddles the polishing groove can no longer be worked with the same groove, i.e., it has substantially lost the capability of being reworked. Due to the above-mentioned excess material removal when the prior art repolishing procedures are performed on a body which is still new, the end of the lifetime of such a body, determined by its ability to be reworked, is reached earlier than necessary.

This drawback is overcome by the process of the present invention, and the lifetime of the body is thus substantially extended, by adjusting the removal depth of the body during the repolishing process so that it is a function of the polishing state of the body.

DESCRIPTION OF THE PREFERRED EMBODIMENTS

Figure 1:
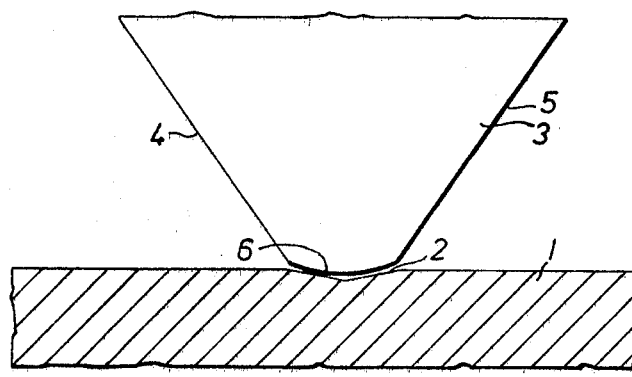
FIG. 1 is a schematic pictorial view, to a greatly enlarged scale, of part of a body which slides in a groove of a record carrier.

FIGS. 1 shows part of a record carrier 1 in cross section with respect to a plane perpendicular to the longitudinal direction of an information-bearing groove 2. As is the custom for video records which are played back according to the pressure scanning technique, groove 2 is rather shallow so that the angle between the groove sides is much greater than 90°. A diamond body 3, which is only shown in part, slides in groove 2 and constitutes part of a pressure scanning pickup. Body 3 is defined, inter alia, by two octahedral surfaces 4 and 5 and preferably has the shape of an octahedral pyramid whose tip 6 is rounded into the form of a cylindrical section. The cylindrical form of this rounded tip 6 can be produced by grinding in a profile grinding groove. Once the shape of the tip has been changed, due to wear, in the direction toward an adaptation to the shape of the profile in groove 2, it can be reestablished by repolishing in an appropriately profiled polishing groove.

Figure 2:
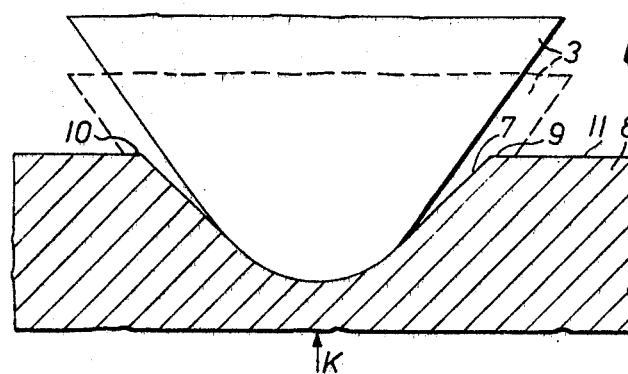
FIG. 2 is a view similar to that of FIG. 1, and to approximately the same scale, of a reworking structure in the form of a polishing or grinding disc with a polishing groove with two bodies sliding therein which have been ground down by successive reworking operations to different extents.

FIG. 2 shows such a polishing groove 7 in a polishing disc 8 which is shown partially in section. Body 3, which here is shown to be polished off to a greater degree than in FIG. 1, slides in this groove. The dashed lines show the same body 3 at a later stage of its useful life, when it has been polished off to such an extent that it is straddling the edges 9 and 10 of the polishing groove and the polishing disc surface 11.

The direction of the contact force K of the polishing disc 8 on the body 3 which is to be reworked is indicated by an arrow. This force is equal in magnitude and opposite in direction to the contact force of body 3 on the polishing disc 8.

Figure 3:
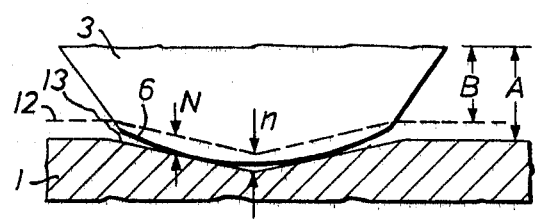
FIGS. 3 and 4 are detail views, to an even larger scale than FIGS. 1 and 2, used to explain the method according to the invention.

FIG. 3 is a detail view, to an enlarged scale, of the central portion of FIG. 1. The solid line 13 represents the relative position of the record carrier surface when the body 3 is in its ideal, or initial, state, while the broken line 12 shows the relative position of the record carrier surface when body 3 has been subjected to such an amount of wear that material has been removed to correspond to the maximum wear depth N. The maximum wear depth is the wear depth at the points of tip 6 at which the greatest amount of wear occurs, starting from the initial cylindrical shape. Thus, wear depth N is measured from the point of contact of a groove wall with the not yet worn tip 6. The minimum wear depth n is produced at the portion of the tip which is aligned with the center of the groove. The amount of wear reduces the distance between a point on each surface 4 and 5 of body 3 and the record carrier 1 from a value A to a value B, i.e., by the maximum wear depth N.

Figure 4:
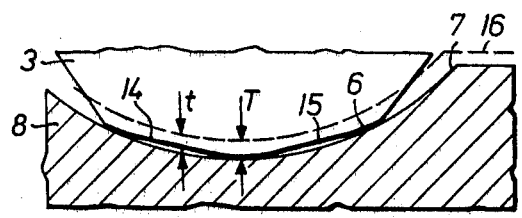

FIG. 4 shows the corresponding conditions with respect to polishing groove 7 in polishing disc 8, the solid lines indicating a state which corresponds to the beginning of a reworking process. In this state the underside of body 3 still possesses parts of its previously rounded tip 6 which correspond with the profile of the polishing groove 7, as well as parts, or facets, 14 and 15 which have assumed the profile of the record carrier groove 2 (FIG. 1) due to wear. Upon completion of reworking, body 3 and the surface of polishing disc 8 have a position relative to one another which is indicated by the broken line 16 representing the polishing disc surface. Compared to the starting state, there results a displacement equal to the maximum removal depth T. The maximum removal depth is the removal depth at the point or points of the tip from which the greatest amount of material is removed during reworking. The minimum removal depth $t$ occurs at those points where the least amount of material is removed during reworking, which correspond to those points where the record disc groove walls had worn most deeply into body 3 during playback or recording.

The above-described figures, particularly FIG. 2, show that the surface of contact between body 3 and polishing groove 7 becomes wider the more body 3 is polished, a state which exists long before the state of straddling has been reached. If it is assumed that in the repolishing technique employed, the contact pressure K and repolishing duration are constant, the maximum removal depth T will decrease, from one reworking process operation to another, from a relatively high value since the contact pressure, i.e., the ratio of contact force K to contact surface, decreases. In order for the maximum removal depth to remain sufficient, even after many reworking processes, so that wear-induced facets 14 and 15 will disappear during repolishing, the maximum removal depth T has previously been selected to be so deep that repeated reworking of body 3 would result in relatively rapid removal of material from the body until the state shown in broken lines in FIG. 2 had been reached.

The present invention overcomes this drawback in that, for example, the repolishing period for each successive reworking process in polishing groove 7 is increased, in dependence on the size of the contact surface of body 3, beginning with low values, either continuously or in steps, during the course of a plurality of reworking processes. In this way the entire useful life of body 3 can be significantly increased, for example by a factor of 2.

In a favorable practical procedure according to the invention, the first repolishing process period has a duration of 2.5 seconds and the repolishing period per each successive repolishing operation is linearly increased by an amount corresponding to an increase of 0.4 seconds for each 10 hours of total wear. This applies for the conditions described in connection with FIGS. 1 through 4.

The process can also be adapted to other conditions, for example other shapes of body 3 or other angles between surfaces 4 and 5 (FIG. 1). If, for example, during the lifetime of body 3 the maximum wear depth N per period of wear remains approximately constant, the process of the present invention is carried out so that the maximum removal depth T obtained in a reworking process is also kept approximately constant. For a body 3 whose cross-sectional surface area in planes parallel to the surface of record carrier 1 increases at progressively greater distances from the surface of record carrier 1, even in those parts of body 3 which will be removed by wear, i.e., even the area which, although above the rounded portion, will be polished away until the straddle state is reached, the removal quantity, measured, for example, in milligrams produced per reworking process should be increased during the lifetime of body 3 so that, assuming the wear depth N is constant the maximum removal depth T remains constant. In other words: with a body 3 which in the area to be removed tapers toward the contact surface, the removal quantity per reworking process must be increased under the above-mentioned conditions during its lifetime.

Instead of, or in addition to, prolonging the duration of successive reworking processes over the lifetime of body 3, it is also possible to increase the contact force K directed toward body 3 over its lifetime. This is possible, however, only within limits, due to the high compliance of the system and the requirement for defined angular disposition of the contact surface of the skid-shaped body with respect to the centerline of the groove.

The lengthening of the reworking period or the increase of the contact force, respectively, can be controlled in dependence on the cumulative total of the lengths of the periods of wear experienced during the use of the particular body, or in dependence on the total number of wear processes, i.e., for example in dependence on the number of video record playings.

The process of the present invention permits in an advantageous manner, for example, the polishing duration to be adapted to the corresponding changing degree of efficiency, or decreasing "sharpness," of the polishing groove. In order to compensate for a decrease in efficiency of the polishing action, it is recommended to increase the polishing period and/or contact pressure more than proportionally to time.

Figure 5:
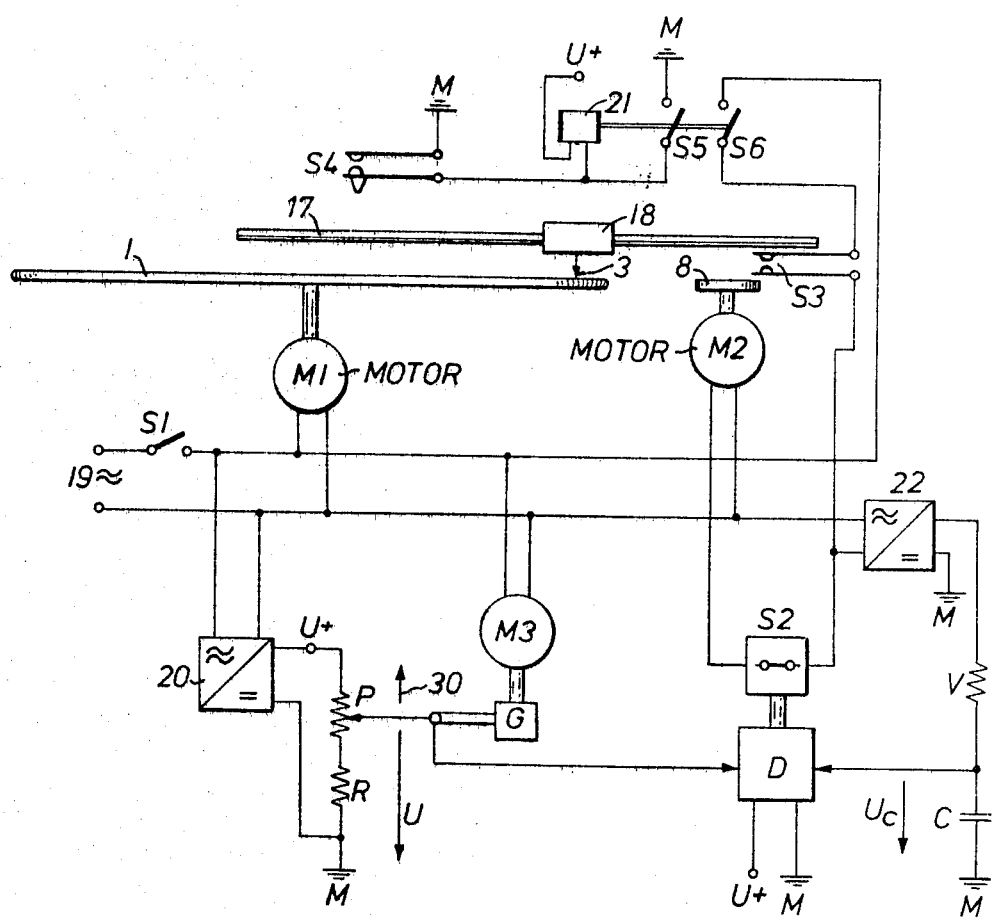
FIG. 5 is a block circuit diagram of a simple embodiment of a device for practicing the method of the invention.

FIG. 5 shows one embodiment of an apparatus for controlling repeated reworkng processes according to the present invention and including such control means. The duration of reworking per reworking process is here not controlled directly in dependence on the cumulative periods of wear of the body, however, but rather in dependence on the cumulative periods of use of the entire apparatus as long as the body in question is installed in this apparatus. If the body is replaced by a new one, the indication of the cumulative period of use must be reset to zero.

The apparatus shown in FIG. 5 includes a drive motor M1, which causes a record carrier 1 to rotate. Along a rail 17 a carriage 18 can be guided parallel to a radius of record carrier 1. A pickup member including body 3 is resiliently fastened to the carriage 18 in accordance with the usual techniques employed in pressure scanning.

In order to play the record carrier 1, carriage 18 is brought to the edge of record carrier 1 and lowered so that body 3 can slide in a groove corresponding to groove 2 of FIG. 1. During playing, carriage 18 slides toward the left until it reaches the last groove turn, at which time it is raised and moved toward the right above the polishing disc 8 driven by polishing motor M2. Carriage 18 is then lowered to bring body 3 into contact with disc 8 in order to carry out a repolishing process. After the repolishing process a new playing process, with resulting wear of body 3, may follow. In the prior art the polishing period was fixed at a constant value by a timed switching mechanism.

In the illustrated device, however, different control means are provided.

To start the device, switch S1 is closed so as to connect, inter alia, drive motor M1 to alternating voltage source 19. At the same time, a rectifier 20, and a synchronous motor M3, having a drive mechanism G coupled thereto are supplied with alternating current.

Rectifier 20 supplies a d.c. voltage U+ to a voltage divider composed of a potentiometer P and in series with a resistor R. As long as switch S1 is closed, drive mechanism G drives the tap of potentiometer P in the direction of arrow 30 so that the tapped voltage U between the potentiometer tap and the ground terminal M progressively increases. This voltage U is fed to a discriminator, or comparator, D which also receives the constant supply voltage U+ from rectifier 20. Discriminator D controls a switch S2 which remains closed if no supply voltage U+ is present.

During its back and forth movement, i.e., when switch S1 is closed, carriage 18 actuates two switches S3 and S4. The one switch, S3, is kept closed by carriage 18 as long as body 3 is lowered on the polishing disc 8 by carriage 18. Switch S4 is actuated for a short time when carriage 18 is raised upon completion of playing of a record carrier 1, carriage 18 then being returned in its raised position back to polishing disc 8.

Closing of switch S4 closes the circuit of a relay winding 21 which is fed by rectifier 20 so that the self-holding contact S5 and the operating contact S6 of the relay are closed and remain closed, due to the self-holding action of contact S5, even after switch S4 opens. When carriage 18 returns to polishing disc 8 and there is lowered, switch S3 is closed so that alternating voltage source 19 supplies current, via the relay operating contact S6, switch S3 and switch S2, to polishing motor M2. This is the beginning of a reworking process for body 3. At the same time, a second rectifier 22 receives alternating voltage via the same path to produce a d.c. output which charges capacitor C via a biasing resistor V for a period of time varying between a few seconds and several tens of seconds.

The capacitor voltage Uc is fed to the discriminator D, which is designed to open switch S2 when capacitor voltage Uc has reached potentiometer voltage U. S2 also remains open if Uc becomes greater than U. Opening of switch S2 switches off polishing motor M2, thus terminating the repolishing process.

The next succeeding repolishing process will have a slightly longer duration because the potentiometer tap will have been displaced upwardly somewhat to increase voltage U and this will slightly increase the time which elapses from the start of a repolishing process until voltage Uc reaches potentiometer tap voltage U.

If body 3 is replaced by a new one, the potentiometer tap must be returned to its starting position by being moved opposite to the direction of arrow 30.

As mentioned above, the repolishing process taking place after each playing process is controlled, in the embodiment according to FIG. 5, by the total period of operation of the device which is determined by summing of the periods of operation of synchronous motor M3 and potentiometer P and which is equal to the cumulative total of the time periods during which switch S1 is closed. This period of operation of course differs somewhat from the period of use, or total wear time, of body 3. However, this difference is so slight that it can be neglected.

Figure 6:
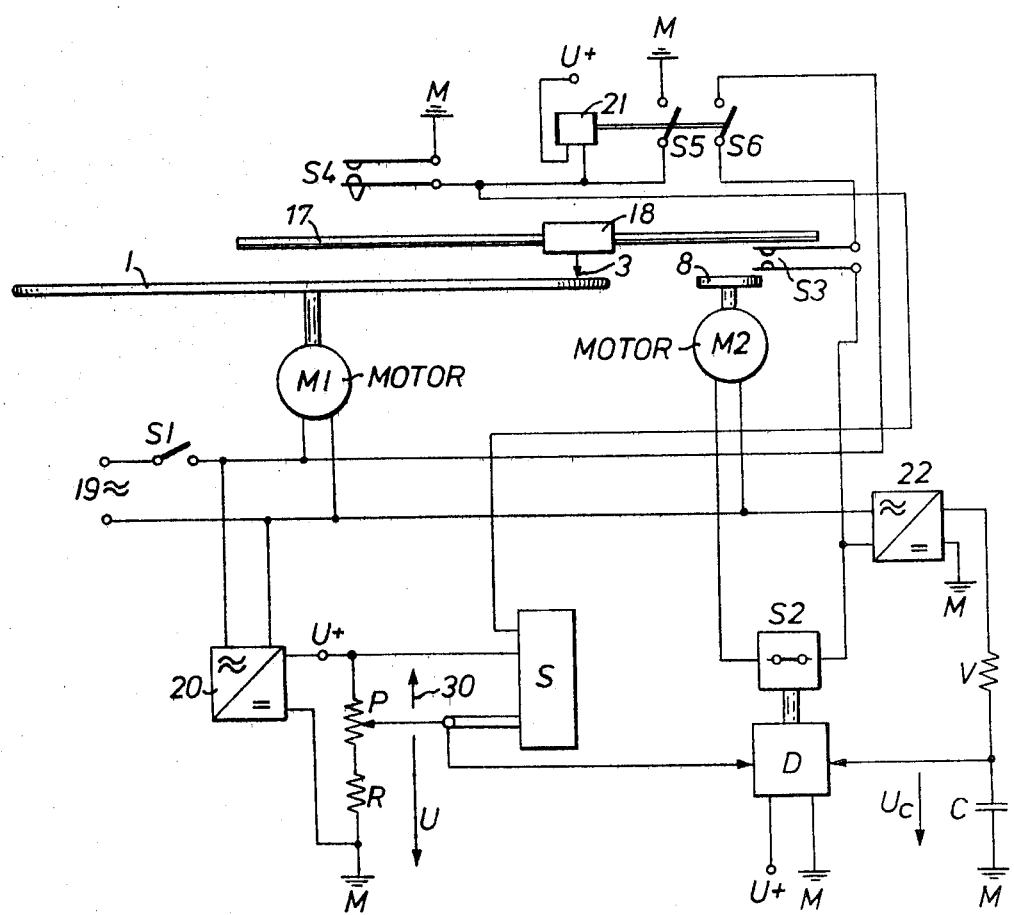
FIGS. 6 and 7 are modifications of FIG. 5.

If the repolishing process is not to be controlled in dependence on the total time of use of body 3 or of the device itself, but in dependence on the number of wear processes, a stepping switch mechanism S or a counter can be connected to switch S4 to advance potentiometer P, as shown in FIG. 6.

If, instead of the reworking period, the contact force K is to be controlled, the potentiometer voltage U could be fed to a magnet which moves carriage 18 toward disc 8 against the restraining force of a spring so as to increase the magnitude of contact force K with increasing potentiometer voltage U.

Figure 7:
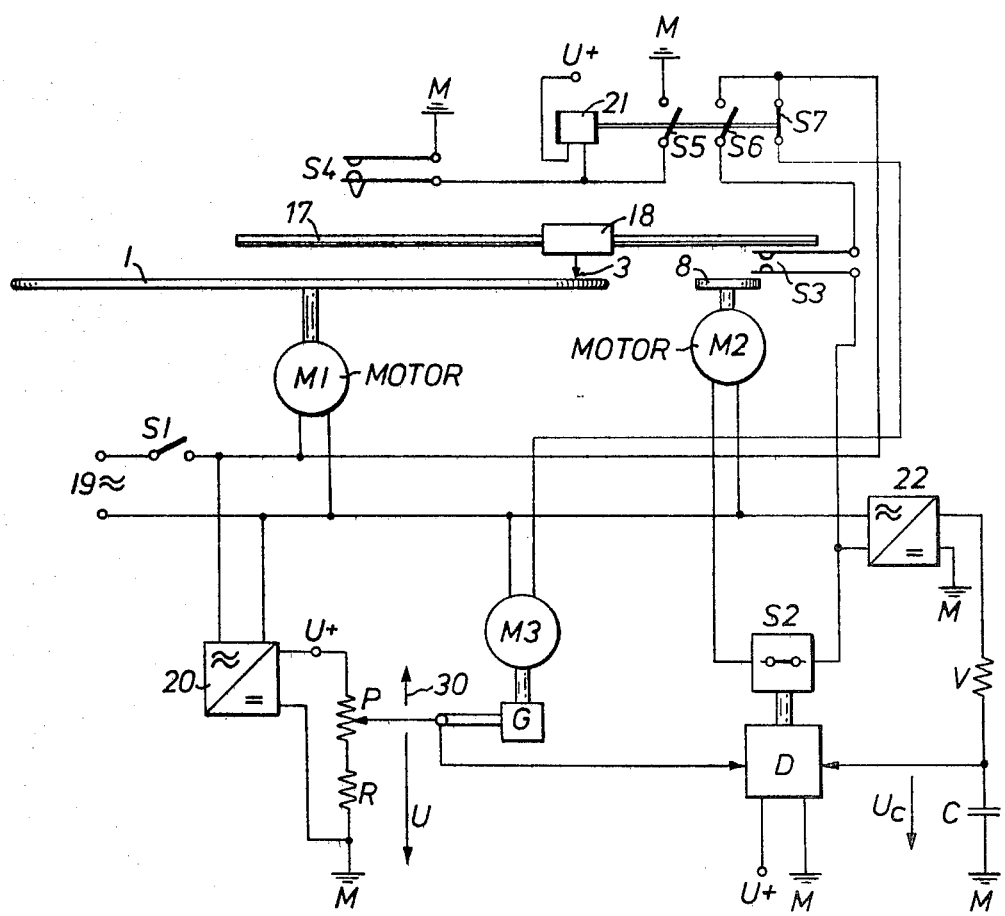

FIG. 7 is an example for controlling the duration of each repolishing process only by the total wear time of the body 3. This kind of controlling is achieved by supplying motor M3 via switch S7, thus avoiding to take the duration of the repolishing processes in the summing executed by motor M3.

The potentiometer P in FIGS. 5 to 7 may be non-linear for example to additionally pay regard to the decreasing sharpness of the polishing groove. This decreasing sharpness also may be respected by not completely resetting the tap of the potentiometer P to its initial position when a new body 3 is inserted.

Figure 10:
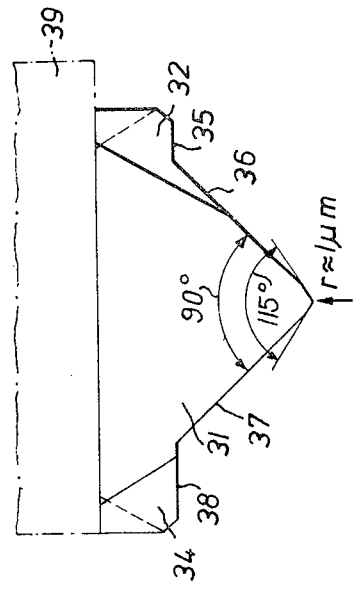
FIGS. 8 to 10 are a top view, a side view and an end view respectively of a complete body in a smaller scale than in FIGS. 1 to 4.
Figure 8:
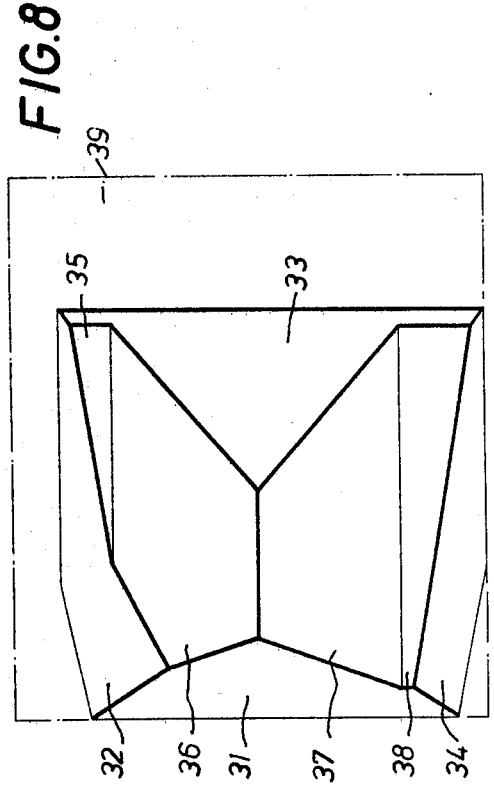
Figure 9:
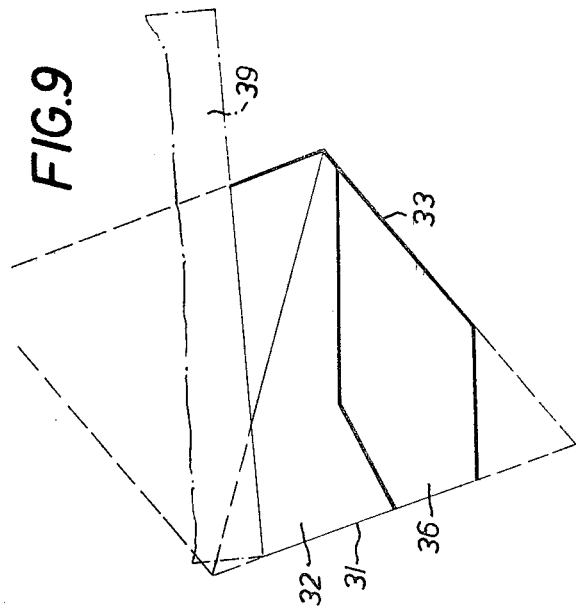

The body 3 in its initial shape may be a tip of a diamond octahedron as shown in FIGS. 8 to 10. The tip is completed by broken lines to the original octahedron in the side view of FIG. 9 for purposes of explanation. The faces 31 to 34 are parts of natural octahedron faces, while the faces 35 to 38 have come into being by grinding with profile grinding means. The tip may be glued to a transducer 39 a part of which is shown in dash-dotted lines. The length of the body shown is about 150 $\mu$m and its hight is about 70 to 80 $\mu$m. The shape of the surface between the legs forming an angle of 115° in FIG. 10 and having the radius r of about 1 $\mu$m correspond to the profile of the polishing groove in FIG. 2.

The composition of a suitable polishing disc is known from the German Offenlegungsschrift No. 23, 50, 732.

It will be understood that the above description of the present invention is susceptible to various modifications, changes and adaptations, and the same are intended to be comprehended within the meaning and range of equivalents of the appended claims.

What is claimed is:

1. In a method for repeatedly reworking a body whose tip, during use, engages a record carrier track to guide a playback or recording member along the track, by subjecting the body to successive reworking operations, each such operation occurring between successive periods of use, each period of use being accompanied by wearing of the tip to a certain maximum depth and alteration of the original tip shape and each reworking operation involving removal of material from the tip of the body to a certain maximum depth to restore the original shape of the tip, the improvement comprising, over the lifetime of the body: deriving a detectable representation of at least an approximation of the maximum wear depth occurring during each period of use between successive reworking operations; and automatically adjusting the maximum removal depth during successive reworking operations to maintain a predetermined relationship with the value of such maximum wear depth during each corresponding preceding period of use.

2. A method as defined in claim 1 wherein, during the lifetime of the body, the maximum wear depth is approximately constant during each period of use, and said step of adjusting is carried out to achieve substantially the same maximum removal depth during each successive reworking operation.

3. A method as defined in claim 2 wherein the body has a form such that, in planes parallel to the plane defined by the surface of the record carrier when the body engages the record carrier track, the cross section of the body increases with increasing distance from the plane of the record carrier surface in the region of the tip of the body, and said step of adjusting is further carried out in a manner to cause the quantity of material removed during each reworking operation to be progressively increased from one reworking operation to a succeeding reworking operation during the lifetime of the body.

4. A method as defined in claim 3 wherein said step of adjusting is carried out to cause the durations of successive reworking operations to be increased from one reworking operation to a succeeding reworking operation during the lifetime of the body.

5. A method as defined in claim 4 wherein each reworking operation is performed by causing the body tip to bear against a shaped abrasive surface whose abrasiveness decreases with use and producing relative movement between the body tip and the abrasive surface, and the duration of such a reworking operation is selected in dependence on the degree to which the abrasiveness of the abrasive surface has decreased prior to such reworking operation.

6. A method as defined in claim 4, wherein the duration of such a reworking operation is selected in dependence on the cumulative total of the durations of all periods of use of the body prior to such reworking operation.

7. A method as defined in claim 4, wherein the duration of such a reworking operation is selected in dependence on the number of periods of use of the body prior to such reworking operation.

8. Apparatus for controlling the operation of a body whose tip, during use, engages a record carrier track to guide a playback or recording member along the track, and which is subjected to successive reworking operations, each such reworking operation occurring between successive periods of use, each period of use being accompanied by wearing of the tip to a certain maximum depth and alteration of the original tip shape and each reworking operation involving removal of material from the tip of the body to a certain maximum depth to restore the original shape of the tip, said apparatus comprising: means defining a shaped abrasive surface; reworking means for causing the body tip to bear against said shaped abrasive surface with a selected bearing force and producing relative movement between the body tip and said shaped abrasive surface for a selected time period to effect each reworking operation; means deriving a detectable representation of at least an approximation of the maximum wear depth occurring during each period of use between successive reworking operations; and means connected to said representation deriving means for automatically adjusting the maximum removal depth during successive reworking operations to maintain a predetermined relationship with the value of such maximum wear depth during each corresponding preceding period of use.

9. An arrangement as defined in claim 8, wherein said means for automatically adjusting are arranged to effect such adjustment in dependence on the total number of wear periods previously experienced by the body.

10. An arrangement as defined in claim 8, wherein said means for automatically adjusting are arranged to effect such adjustment in dependence on the cumulative total of the durations of the periods of use of the body.

11. An arrangement as defined in claim 8, wherein said control means for automatically adjusting are arranged to effect such adjustment in dependence on the cumulative total of the durations of periods of operation of said apparatus during the lifetime of the body.

12. A method as defined in claim 1 wherein said step of deriving is carried out in order to produce, as the detectable representation, a voltage proportional to the total time of use of the body, and said step of automatically adjusting is carried out by causing the duration of each reworking operation to be proportional to the currently existing value of that voltage.

* * * * *